(12) United States Patent
Waddleton et al.

(10) Patent No.: US 11,459,958 B2
(45) Date of Patent: Oct. 4, 2022

(54) ROTODYNAMIC PUMP HAVING A BODY DEFINING A BODY CAVITY WITH A FIRST AND SECOND HOUSING PORTION DEFINING A PORTION OF AN IMPELLER CAVITY AND DISPOSED WITHIN THE BODY CAVITY WHEREIN THE BODY CAVITY EXTENDS AT LEAST IN PART AROUND THE SECOND HOUSING PORTION AND THE HOUSING PORTIONS DEFINING AN IMPELLER CLEARANCE

(71) Applicant: PRATT & WHITNEY CANADA CORP., Longueuil (CA)

(72) Inventors: David Waddleton, Candiac (CA);
Benjamin Renaud, Montreal (CA);
Sebastien Bergeron, Chambly (CA);
Etienne Plamondon, Candiac (CA);
Jean-Gabriel Gauvreau, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 526 days.

(21) Appl. No.: 16/361,819

(22) Filed: Mar. 22, 2019

(65) Prior Publication Data
US 2020/0300179 A1    Sep. 24, 2020

(51) Int. Cl.
| | |
|---|---|
| *F02C 9/28* | (2006.01) |
| *F02C 9/30* | (2006.01) |
| *F04D 15/00* | (2006.01) |
| *F02C 7/22* | (2006.01) |
| *B64D 37/00* | (2006.01) |

(52) U.S. Cl.
CPC .............. *F02C 9/28* (2013.01); *F02C 7/22* (2013.01); *F02C 9/30* (2013.01); *F04D 15/0022* (2013.01); *B64D 37/00* (2013.01); *F05D 2270/301* (2013.01)

(58) Field of Classification Search
CPC ... B64D 37/00; F02C 7/22; F02C 9/28; F02C 9/30; F04D 15/0022; F04D 15/0033; F04D 15/005; F04D 5/008; F04D 15/0038
USPC ................. 415/129, 131; 417/279
See application file for complete search history.

(56) References Cited

U.S. PATENT DOCUMENTS

| | | | | | |
|---|---|---|---|---|---|
| 2,337,639 | A | * | 12/1943 | Brummer ................. | F16J 15/36 277/392 |
| 2,342,219 | A | * | 2/1944 | Price ................... | F04D 27/0253 415/150 |
| 2,957,424 | A | * | 10/1960 | Brundage ........... | F04D 15/0038 415/48 |

(Continued)

FOREIGN PATENT DOCUMENTS

| | | |
|---|---|---|
| DE | 943803 C | 6/1956 |
| EP | 636791 A1 | 2/1995 |

*Primary Examiner* — Kenneth J Hansen
*Assistant Examiner* — Benjamin Doyle
(74) *Attorney, Agent, or Firm* — Norton Rose Fulbright Canada LLP

(57) ABSTRACT

A rotodynamic pump for pumping a fluid includes an impeller, a housing surrounding the impeller, and a pressure regulating mechanism. The pressure regulating mechanism is configured to adjust the clearance between the impeller and the impeller housing to regulate pressure of the fluid downstream of the impeller. A method of regulating the delivery pressure is also disclosed.

13 Claims, 4 Drawing Sheets

(56) References Cited

U.S. PATENT DOCUMENTS

| | | | | |
|---|---|---|---|---|
| 3,142,259 A * | 7/1964 | Tyler | ............ | F04D 15/00 137/115.16 |
| 3,280,748 A * | 10/1966 | Ogles | ............ | F04D 29/167 415/132 |
| 3,404,631 A * | 10/1968 | Nixon | ............ | F04D 29/042 415/126 |
| 3,407,740 A * | 10/1968 | Samerdyke | ............ | F04D 29/042 415/131 |
| 3,482,523 A * | 12/1969 | Morando | ............ | F04D 15/0038 415/27 |
| 3,656,861 A | 4/1972 | Zagar | | |
| 3,667,722 A | 6/1972 | Katz | | |
| 3,901,623 A * | 8/1975 | Grennan | ............ | F04D 29/247 415/141 |
| 3,918,831 A * | 11/1975 | Grennan | ............ | F04D 29/2277 415/131 |
| 4,213,735 A * | 7/1980 | Grennan | ............ | F04D 15/0038 415/131 |
| 4,417,849 A * | 11/1983 | Morris | ............ | F04D 15/0038 192/85.23 |
| 4,449,506 A | 5/1984 | Drutchas | | |
| 4,643,635 A * | 2/1987 | Leachman, Jr. | ...... | F02M 37/18 415/1 |
| 4,752,183 A * | 6/1988 | Sakurai | ............ | F04D 29/042 415/12 |
| 4,828,454 A * | 5/1989 | Morris | ............ | F04D 15/0038 415/131 |
| 4,948,344 A | 8/1990 | Cygnor | | |
| 5,169,286 A * | 12/1992 | Yamada | ............ | F01P 5/10 277/558 |
| 5,431,340 A * | 7/1995 | Schirpke | ............ | B60H 1/08 237/12.3 B |
| 5,782,604 A * | 7/1998 | Luxford | ............ | B41J 2/17596 347/75 |
| 5,800,120 A * | 9/1998 | Ramsay | ............ | F04D 15/0038 415/129 |
| 6,022,197 A | 2/2000 | Cygnor et al. | | |
| 6,059,537 A | 5/2000 | Cygnor | | |
| 6,074,167 A * | 6/2000 | Olifirov | ............ | F01D 17/143 415/131 |
| 6,209,309 B1 * | 4/2001 | McArthur | ............ | F02C 7/22 137/487.5 |
| 6,527,506 B2 | 3/2003 | Pickelman et al. | | |
| 7,186,071 B2 * | 3/2007 | Pascoe | ............ | F04D 15/0038 415/131 |
| 7,559,315 B1 | 7/2009 | Yu et al. | | |
| 8,529,221 B2 | 9/2013 | Futa, Jr. | | |
| 8,608,452 B2 * | 12/2013 | Draheim | ............ | F04D 15/0038 417/212 |
| 9,599,112 B2 * | 3/2017 | Durand | ............ | F01P 7/162 |
| 9,869,326 B2 | 1/2018 | Stark et al. | | |
| 10,041,497 B2 | 8/2018 | Nyzen | | |
| 10,794,260 B2 * | 10/2020 | Lee | ............ | F04D 15/0038 |
| 2004/0079081 A1 | 4/2004 | Jevons | | |
| 2005/0072160 A1 * | 4/2005 | Futa, Jr. | ............ | F02C 9/36 60/773 |
| 2010/0006044 A1 * | 1/2010 | Duley | ............ | F01P 5/12 123/41.02 |
| 2013/0320148 A1 | 12/2013 | Lewis | | |
| 2015/0184594 A1 * | 7/2015 | Stammen | ............ | F23R 3/28 60/776 |
| 2016/0186670 A1 | 6/2016 | Oba | | |
| 2016/0290340 A1 * | 10/2016 | Maurino | ............ | F04D 29/042 |
| 2017/0204803 A1 * | 7/2017 | Pursifull | ............ | F02D 41/123 |

* cited by examiner

ROTODYNAMIC PUMP HAVING A BODY DEFINING A BODY CAVITY WITH A FIRST AND SECOND HOUSING PORTION DEFINING A PORTION OF AN IMPELLER CAVITY AND DISPOSED WITHIN THE BODY CAVITY WHEREIN THE BODY CAVITY EXTENDS AT LEAST IN PART AROUND THE SECOND HOUSING PORTION AND THE HOUSING PORTIONS DEFINING AN IMPELLER CLEARANCE

TECHNICAL FIELD

The application relates to rotodynamic fuel pumps for aircraft engine fuel systems.

BACKGROUND

Fuel pumps for prior art aircraft engine fuel systems are known. Prior art fuel pumps typically use recirculation arrangements with a pressure regulator that selectively recirculate fuel from a pump's outlet to the pump's inlet and thereby regulate the fuel delivery pressure provided by the pump. While suitable for their intended purposes, such prior art fuel pumps have drawbacks. For example, in some cases, recirculation of fuel to a pump's inlet may negatively affect the pump's operational performance under depressed inlet conditions. Thus, improvements to prior art fuel pump technology could be made.

SUMMARY

In one aspect, the present technology provides a rotodynamic pump for pumping a fluid. The pump includes an impeller, a housing surrounding the impeller and a pressure regulating mechanism configured to adjust the clearance between the impeller and the impeller housing to regulate pressure of the fluid downstream of the impeller.

In some embodiments, the housing includes a first housing portion defining at least in part the impeller cavity, and a second housing portion defining at least in part the impeller cavity, the second housing portion being movable relative to the first housing portion during operation of the rotodynamic pump to vary the clearance between the impeller and the impeller cavity, and the pressure regulating mechanism is configured to move the second housing portion relative to the first housing portion to vary the clearance and thereby regulate a delivery pressure of the fluid at an outlet of the pump.

In some embodiments, the pump further includes a fluid conduit hydraulically connecting an outlet of the pump to a cavity defined at least in part by the second housing portion to feed fluid from the outlet to the cavity to apply a force on the second housing portion.

In some embodiments, the pump further includes a biasing element biasing the second housing portion toward the first housing portion.

In some embodiments, the pump further includes a bellows, the bellows and the biasing element being movable by movement of the second housing portion relative to the first housing portion.

In some embodiments, the pump further includes a body extending around at least in part around the second housing portion, wherein an inner surface of the body, an outer surface of the bellows, and an outer surface of the second housing portion define the cavity, the cavity being hydraulically isolated from an outer surface of the body.

In some embodiments, the biasing element is a spring disposed between the second housing portion and the body, and the second housing portion is movable away from the first housing portion to compress the spring and the bellows.

In some embodiments, the impeller is rotatable about a rotation axis to pump the fluid from the inlet to the outlet, and the second housing portion is movable relative to the first housing portion in a direction parallel to the rotation axis.

In another aspect, the present technology provides a fuel system for an aircraft engine, comprising the rotodynamic pump as described above, the rotodynamic pump when in use supplying fuel to the aircraft engine.

In some embodiments, the pressure regulating mechanism includes an actuator operatively connected to the second housing portion and a controller communicatively coupled to the actuator, the pressure regulating mechanism regulating the delivery pressure toward a delivery pressure setpoint by operating the actuator by the controller to selectively displace the second housing portion relative to the first housing portion in response to a signal indicative of the delivery pressure.

In some embodiments, the actuator includes at least one of an electric motor, and a hydraulic actuator operable via at least one electrically operated hydraulic valve that is communicatively coupled to the controller.

In some embodiments, the pump further includes a pressure sensor communicatively coupled to the controller and being hydraulically connected to the outlet to generate the signal while the rotodynamic pump is in use.

In some embodiments, the delivery pressure setpoint is a range of pressures.

In some embodiments, the controller includes a processor and a non-transient memory communicatively coupled to the processor, the non-transient memory storing processor-executable instructions which, when executed by the processor, cause the controller to execute a proportional-integral-derivative (PID) control algorithm to operate the actuator in response to the signal to regulate the delivery pressure toward the delivery pressure setpoint.

In another aspect, the present technology provides a method of regulating a delivery pressure of fluid supplied by a rotodynamic pump, the pump having a clearance between an impeller and an inner surface of a housing of the pump that defines an impeller cavity housing at least part of the impeller. The method includes operating the pump by rotating the impeller to generate a delivery pressure of the fluid downstream of the impeller, and during the rotating of the impeller, performing at least one of (i) in response to the delivery pressure exceeding a delivery pressure setpoint, increasing the clearance, and (ii) in response to the delivery pressure falling below the delivery pressure setpoint, decreasing the clearance.

In some such embodiments, the delivery pressure setpoint is a range of pressures.

In some embodiments, the increasing the clearance includes moving a part of the housing away from another part of the housing, and the decreasing the clearance includes moving the part of the housing toward the other part of the housing.

In some embodiments, the method further includes receiving a signal at a controller, the signal being indicative of the delivery pressure, and operating, by the controller, an actuator to move a part of the housing relative to another part of the housing to regulate the clearance in response to changes of the delivery pressure indicated by the signal to regulate the delivery pressure toward the delivery pressure setpoint.

In some embodiments, the operating the actuator includes executing, by the controller, a proportional-integral-derivative (PID) control algorithm with the delivery pressure being an input to the PID control algorithm.

In some embodiments, the increasing the clearance and the decreasing the clearance is executed by a passive pressure regulating mechanism.

DESCRIPTION OF THE DRAWINGS

Reference is now made to the accompanying figures in which.

DETAILED DESCRIPTION

For the purposes of the present description, the term "fuel conduit" is used to describe an arrangement of one or more elements, such as one or more hoses, connectors and other elements, that together form a flow path or flow paths for a liquid fuel to flow from point A to point B. For example, a given fuel conduit may be defined by any number and combination of hoses hydraulically interconnected in parallel and/or series, by or with one or more fuel filters, switches, pumps, and the like, depending on the particular function(s) and/or application of the given fuel conduit and/or the particular type of engine 10 with which the given fuel conduit is used for example.

Figure 1:
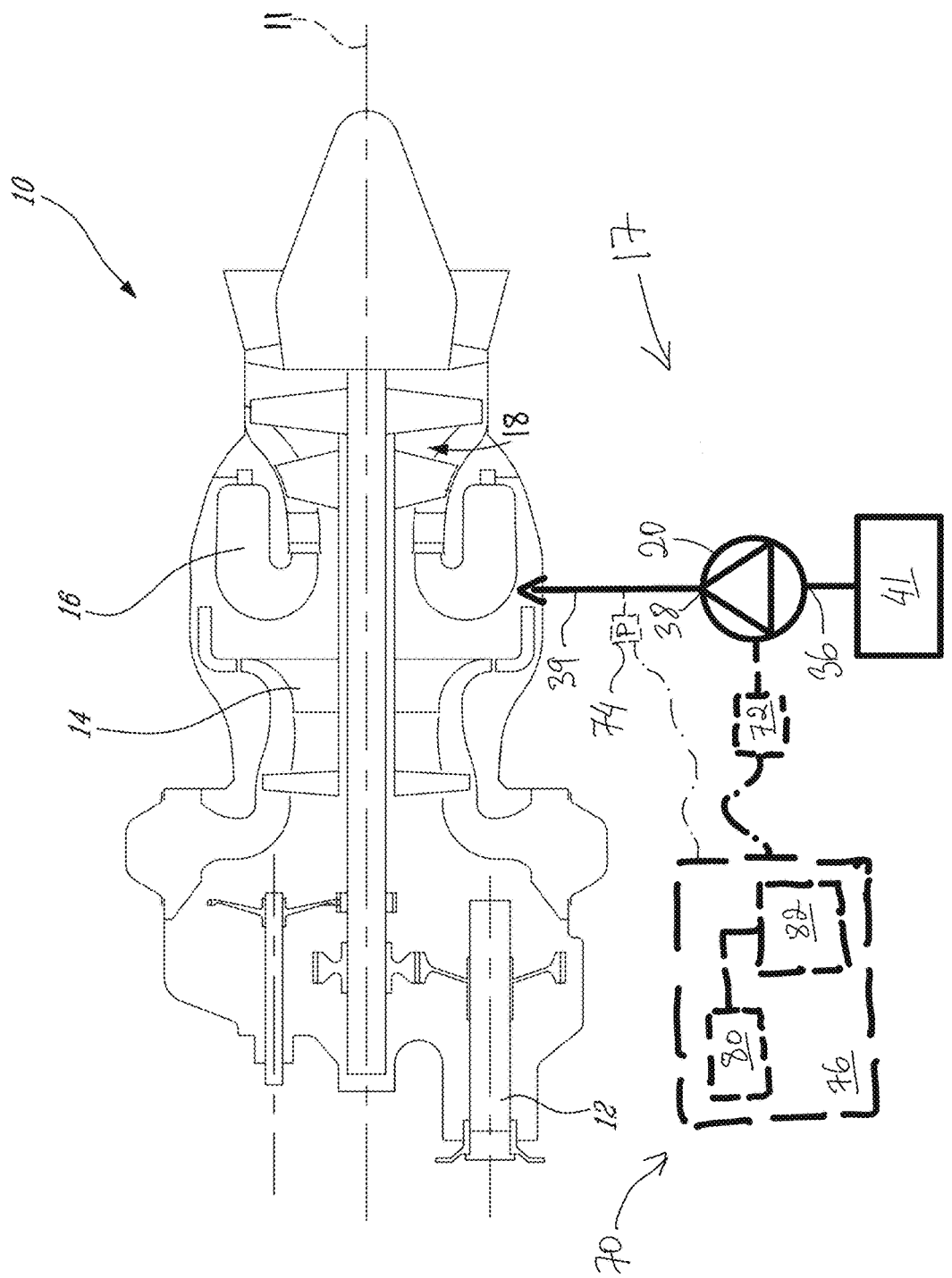
FIG. 1 is a schematic showing an aircraft engine and a part of a fuel system of the aircraft engine.

FIG. 1 illustrates an aircraft engine 10 of a type preferably provided for use in subsonic flight, generally comprising in serial flow communication a shaft 12 connectable to a fan or other rotor, such as a helicopter rotor, for propelling ambient air, a compressor section 14 for pressurizing ambient air, a combustor 16 in which the compressed air is mixed with fuel and ignited for generating an annular stream of hot combustion gases, and a turbine section 18 for extracting energy from the combustion gases. Components of the engine 10 are rotatable about a longitudinal center axis 11 of the engine 10. In the present embodiment, the engine 10 is a turboshaft engine. It is contemplated that the engine 10 could be a different type of engine, such as a rotary engine or a turbofan engine for example.

Figure 2:
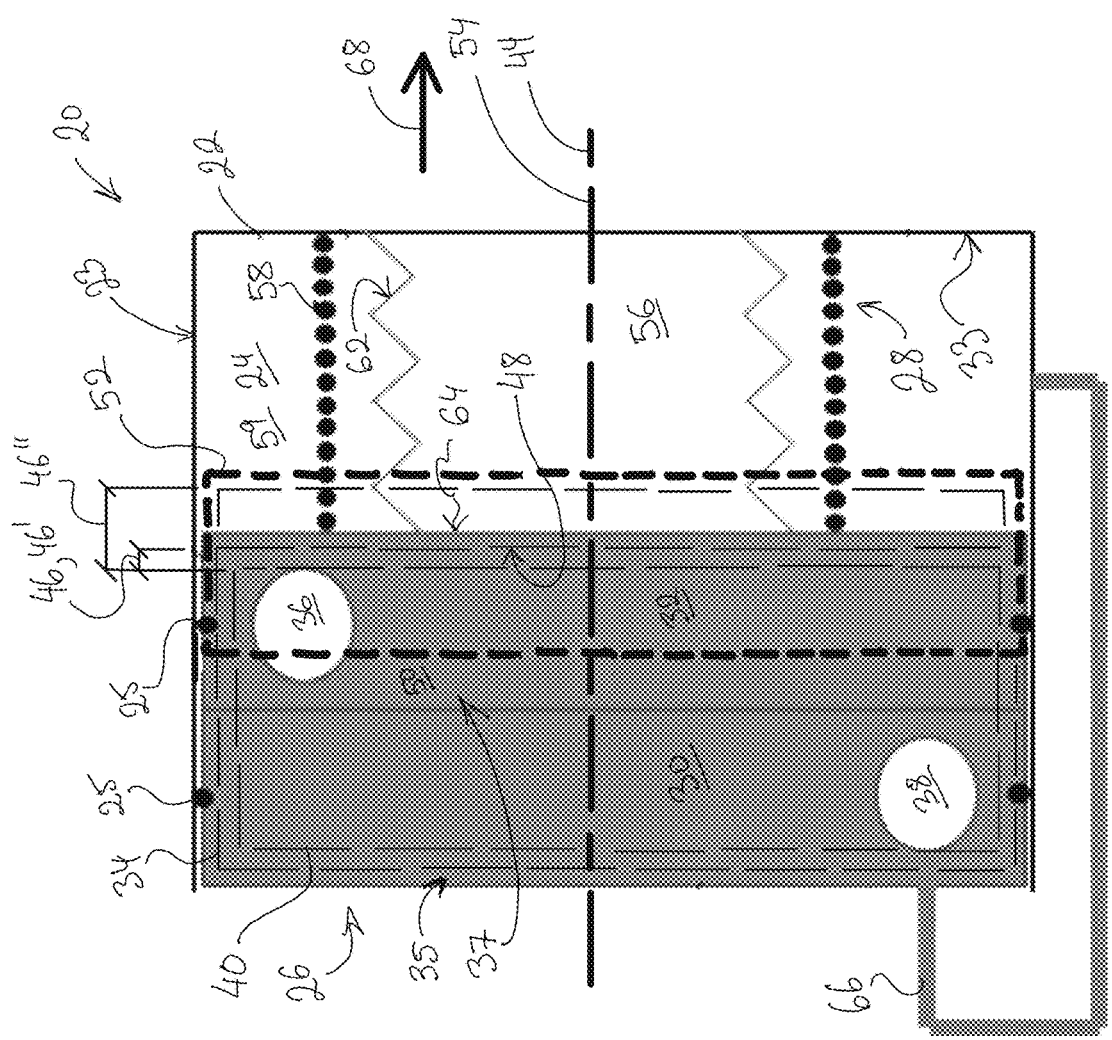
FIG. 2 is a schematic side view showing a variable clearance rotodynamic pump of the fuel system of FIG. 1.

Referring to FIGS. 1 and 2, fuel is supplied to the combustor 16 via a fuel system 17 having one or more rotodynamic pumps 20, one of which is shown schematically. In the present non-limiting example embodiment, the pump 20 includes a body 22. The body 22 defines a cavity 24 therein. A housing 26 is received in the cavity 24 of the body 22. A pressure regulating mechanism 28 is operatively connected to the housing 26 to selectively vary a clearance between an impeller of the pump 20 and at least a part of a surface defining an impeller cavity that houses the impeller, as described in detail below.

In the present embodiment, the pressure regulating mechanism 28 is a passive pressure regulating mechanism that is disposed at least in part in the cavity 24 and is operated by the fluid being pumped by the pump 20. As explained in detail below, in some embodiments the pump 20 includes an active pressure regulating mechanism which includes an actuator operated by a controller in response to a signal that is indicative of a delivery pressure of the fluid being pumped by the pump 20.

It is contemplated that in some embodiments, the pressure regulating mechanism of the pump 20, whether it is of the active or the inactive type, could be disposed in whole or in part outside of the cavity 24. It is contemplated that at least in some embodiments the body 22 and/or the cavity 24 could be omitted. It is contemplated that the pressure regulating mechanism of the pump 20 could include both a passive and an active pressure regulating mechanism. It is also contemplated that any pressure regulating mechanism suitable for varying a clearance around at least a part of an impeller of the pump 20, as described in this document, could be used.

As shown in FIG. 2, in the present embodiment, the body 22 of the pump 20 extends at least in part around the housing 26. It is contemplated that in some embodiments the body 22 could be omitted. In the present embodiment, the housing 26 includes a fixed housing portion 30 that is fixed to the body 22 (e.g., attached to the body 22, integral to the body 22) and a movable housing portion 32 that is movable relative to the fixed housing portion 30. In the present embodiment, the fixed housing portion 30 bounds the cavity 24. It is contemplated that the fixed housing portion 30 could be and/or could define a cap, or another element, that closes off the cavity 24 in embodiments of the pump 20 that have the cavity 24. The fixed housing portion 30 may be part of the body 22.

It is contemplated that the housing 26 could have a different construction that would achieve the functionality of the pump 20 as described in this document. For example, it is contemplated that the fixed housing portion 30 could be made movable relative to both the body 22 and the movable housing portion 32, in which case the fixed housing portion 30 would be a movable housing portion. It is also contemplated that the housing 26 could be constructed of a different number of portions, one or more of which could be movable relative to one or more of the other portions in ways other than the way in which the movable housing portion 32 is movable/displaceable relative to the fixed housing portion 30, so long as the housing 26 would provide the impeller clearance variation functionality of the pump 20 as described in this document.

In the present embodiment, the fixed housing portion 30 and the movable housing portion 32 are received in the cavity 24 of the body 22 and hydraulically seal the cavity 24 from an outer surface 23 of the body. To this end, and now also referring to FIG. 3, at least a peripheral part of an inner surface 33 of the body 22, and at least parts of an outer surface 35, 37 of each of the fixed housing portion 30 and the movable housing portion 32, respectively, may by shaped to mate with each other. For example, the inner surface 33 and the outer surfaces 35, 37 may be generally cylindrical in shape at least insofar as to mate with each other. A seal(s) 25 (FIG. 2) may be received between a periphery of each of the housing portions 30, 32 and corresponding parts of the peripheral part of the inner surface 33 of the body 22. It is contemplated that different shapes and sealing methods could be used. Consequently, a translational joint may be formed allowing the relative movement between the housing portions 30 and 32. Additional complementary components may be present to constrain the translational motion, such as rails, tracks, grooves, sliding posts, etc.

Referring back to FIG. 2, the fixed housing portion 30 and the movable housing portion 32 define an impeller cavity 34 therebetween. It is contemplated that the housing 26 could have a different number of portions defining the impeller cavity 34. In the present embodiment, the movable housing portion 32 defines therein an inlet 36, for connecting a fuel source 41 (FIG. 1) to the pump 20. The fixed housing portion 30 defines therein an outlet 38 of the pump 20, for connecting a supply fuel conduit 39 thereto for delivering fuel from the pump 20 to the combustor 16 of the aircraft engine 10.

In the present embodiment, the inlet 36 and the outlet 38 are hydraulically connected to the impeller cavity 34. It is contemplated that the inlet 36 could be defined in the fixed housing portion 30 and the outlet 38 in the movable housing portion 32. It is also contemplated that the inlet 36 and the outlet 38 could be defined in yet other portions of the housing 26 and/or in other portions of the pump 20, depending on each particular embodiment of the pump 20, so long as the functionality described in this document is provided.

Still referring to FIG. 2, an impeller 40 is disposed at least in part in the impeller cavity 34 for pumping fuel from the fuel source 41 into the inlet 36, through the impeller cavity 34, to the outlet 38, and then to the combustor 16 of the engine 10. To this end, the impeller 40 is rotatable by a power source, such as a shaft of the engine 10, in the direction shown with arrow 42 (FIG. 3) about a rotation axis 44.

In the present embodiment, the pump 20 is structured such that the movable housing portion 32 is movable relative to the fixed housing portion 30 in parallel with the rotation axis 44. It is contemplated that in other embodiments of the pump 20, a movement vector of the movable housing portion 32 could be non-parallel to the rotation axis 44. It is also contemplated that a different direction of rotation 42 of the impeller 40 could be used, depending on the locations of the inlet 36 and the outlet 38 in each particular embodiment of the pump 20 for example.

As schematically shown in FIG. 2, the impeller 40 and the movable housing portion 32 define a clearance 46 therebetween. In the present embodiment, the clearance 46 is defined between the impeller 40 and an inner surface 48 of the movable housing portion 32. The size of the clearance 46 is a factor that determines an operating efficiency of the pump 20.

In turn, the operating efficiency is a factor that determines the delivery pressure of the fuel downstream of the impeller 40. The present technology regulates the delivery pressure of the fuel by varying the clearance 46. It is contemplated that in other embodiments of the pump 20, the clearance 46 could be defined between the impeller 40 and a different part of the housing 26, so long as the impeller clearance variation functionality of the pump 20 as described in this document is provided.

Figure 3:
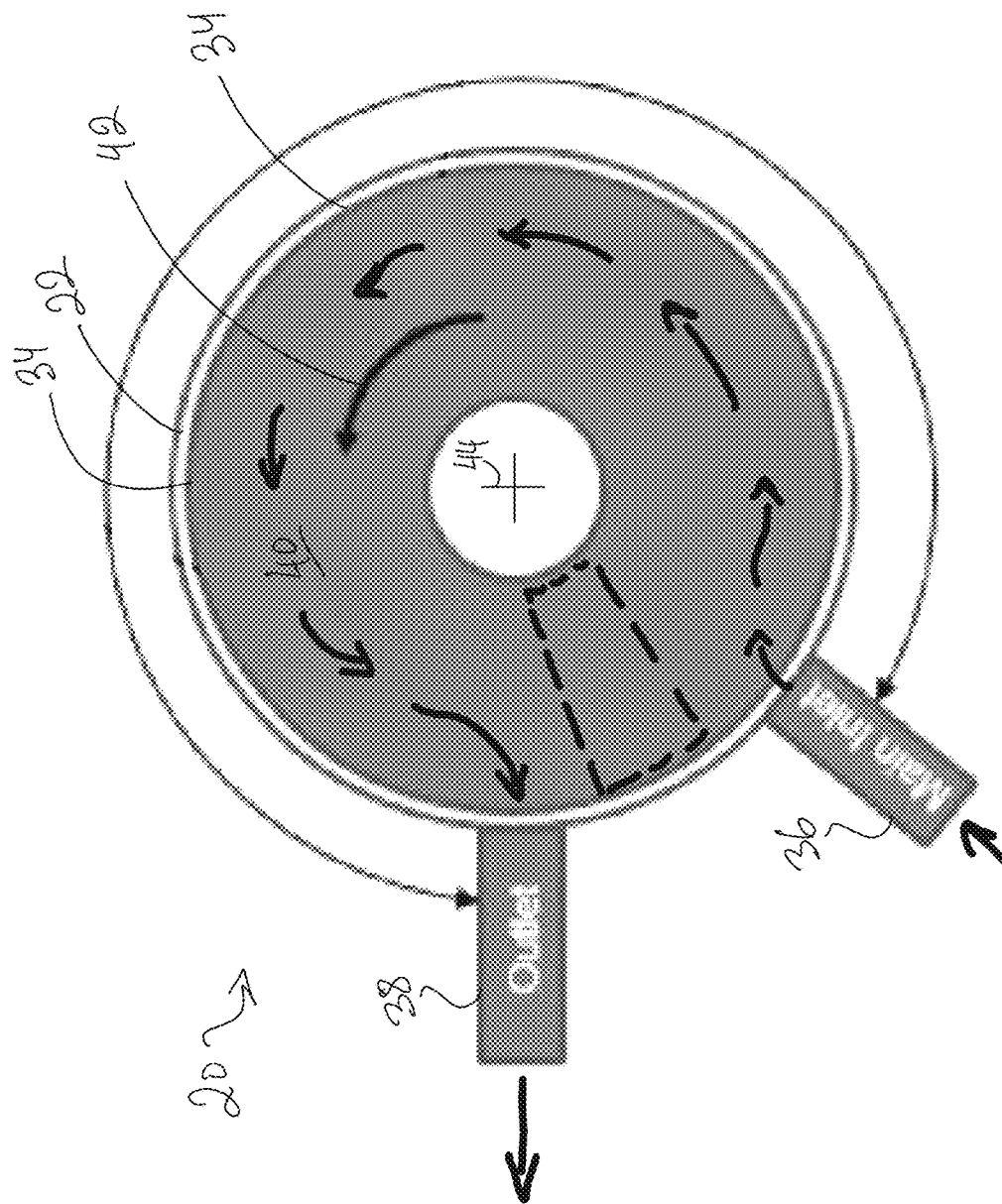
FIG. 3 is a schematic plan view showing the rotodynamic pump of FIG. 2.

In the embodiment shown in FIGS. 2 and 3, to provide the impeller clearance variation functionality, the movable housing portion 32 is constructed to be movable during operation of the pump 20 relative to the fixed housing portion 30 between a higher pumping efficiency position 50 and an lower pumping efficiency position 52 along a movement axis 54. In an embodiment, the movement axis 54 is substantially parallel to the rotation axis 44 (i.e., more or less 5 degrees).

The movable housing portion 32 is in the higher pumping efficiency position 50 in FIG. 2. The movable housing portion 32 being in the lower pumping efficiency position 52 is shown in dashed lines. As shown with reference numerals 46' and 46", the clearance 46 is larger when the movable housing portion 32 is in the lower pumping efficiency position 52 than when the movable housing portion 32 is in the higher pumping efficiency position 50. The larger the clearance 46, the lower the operating efficiency and the head of the pump 20, and vice versa.

Referring to FIG. 2, in the present embodiment, the pressure regulating mechanism 28 controls the size of the clearance 46 during operation of the pump 20 and thereby regulates the delivery pressure toward a delivery pressure setpoint of the pump 20. To this end, the passive pressure regulating mechanism 28 includes a bellows 56 and/or a spring 58 that is/are disposed inside a cavity 59 defined by the inner surface 33 of the body 22, an outer surface 62 of the bellows 56, and the outer surface 37 of the movable housing portion 32. In the present embodiment, the spring 58 is a coil spring disposed around the bellows 56 coaxially with therewith.

It is contemplated that in some embodiments, the bellows 56 and the spring 58 need not be coaxial, and/or need not be disposed one over the other. It is contemplated that in some embodiments, the passive pressure regulating mechanism 28 could have one or more bellows 56 and no springs 58, so long as the functionality of the passive pressure regulating mechanism 28 as described in this document is provided. It is contemplated that in some embodiments without springs 58, the bellows 56 could include one or more internal springs and/or could be constructed to provide the biasing force that would provide for the functionality of the passive pressure regulating mechanism 28 as described in this document. It is also contemplated that in some embodiments, the passive pressure regulating mechanism 28 could have one or more springs 58 and no bellows 56, so long as the functionality of the passive pressure regulating mechanism 28 as described in this document is provided. It is contemplated that in some embodiments, passive actuation may be achieved solely by fluid pressure in the cavity 59, i.e., without any bellows 56 and/or springs 58 so long as the functionality of the passive pressure regulating mechanism 28 as described in this document is provided.

In the present embodiment, the cavity 59 is part of the cavity 24 of the body 22. As the movable housing portion 32 defines a surface of the cavity 59, a volume of the cavity 59 may vary in response to movements of the movable housing portion 32. The passive pressure regulating mechanism 28 is, and hence in the present embodiment the bellows 56 and the spring 58 are, disposed between the movable housing portion 32 and the body 22. The passive pressure regulating mechanism 28 is, and hence the bellows 56 and the spring 58 are, at one end connected to the movable housing portion 32 and at another end to the inner surface 33 of the body 22. The passive pressure regulating mechanism 28 may thereby apply a biasing force on the movable housing portion 32 to bias the movable housing portion 32 to the higher pumping efficiency position 50. In the present embodiment, the higher pumping efficiency position 50 and the lower pumping efficiency position 52 define limits of a range of movement of the movable housing portion 32, however this need not be the case.

Still referring to FIG. 2, the pump 20 further comprises a fluid conduit 66 which hydraulically connects the outlet 38 to the cavity 59 containing the bellows 56. The fluid conduit 66 feeds fuel from the outlet 38 to the cavity 59. Delivery pressure generated by the impeller 40 is thus applied by fuel on the outer surface 62 of the bellows 56 via the fluid conduit 66. The characteristics of the passive pressure regulating mechanism 28, and in the present embodiment the characteristics of the bellows 56 and the characteristics of the spring 58, including a spring rate of the spring 58, are selected based on each particular embodiment of the pump 20 to define a particular design delivery pressure setpoint for the pump 20.

More particularly, the characteristics of the bellows 56 and the characteristics of the spring 58 are selected such that when the delivery pressure exceeds the delivery pressure setpoint, the design pressure starts compressing the bellows 56, thereby moving the movable housing portion 32 away from the fixed housing portion 30 toward the lower pumping efficiency position 52 and compressing the spring 58. Fuel flowing through the impeller cavity 34 also applies a pressure to the inner surface 48 of the movable housing portion 32 and thereby contributes to compressing the bellows 56 and the spring 58.

Compression of the passive pressure regulating mechanism 28 and the corresponding movement of the movable housing portion 32 are shown with arrow 68 in FIG. 2. As the movable housing portion 32 moves away from the fixed housing portion 30, the operating efficiency and the delivery pressure, of the pump 20 decrease. The harder it is to compress the bellows 56 and the stronger the spring 58, the higher the delivery pressure needs to be to start compressing the passive pressure regulating mechanism 28. Thus, the passive pressure regulating mechanism 28 could be constructed with different "resistance" characteristics for each particular embodiment and application of the pump, in order to define the fluid pressure at which the passive pressure regulating mechanism 28 will start to compress. The delivery pressure setpoint could be defined this way.

It is contemplated that the particular characteristics and/or the particular type(s) of characteristics of the passive pressure regulating mechanism 28 that are selected to define a particular design delivery pressure setpoint for the pump 20 could be different depending on each particular embodiment passive pressure regulating mechanism 28. It is contemplated that passive pressure regulating mechanism 28 could be constructed so as to allow for the characteristics to be adjustable.

It is also contemplated that the pump 20 could be constructed such that the direction 68 of movement of the movable housing portion 32 is different. For example, it is contemplated that the movable housing portion 32 may be movable along, rather than away from, the fixed housing portion 30 to increase the clearance 46. It is contemplated that in some such embodiments, the clearance 46 could be defined differently. For example, as a space between the impeller 40 and a peripheral part of the movable housing portion 32.

As the delivery pressure drops, so do the forces with which the bellows 56 and the spring 58 are compressed. As the delivery pressure drops to the delivery pressure setpoint of the pump 20, the forces with which the bellows 56 and the spring 58 are compressed become balanced with the biasing forces of the passive pressure regulating mechanism 28. When the compression and the biasing forces balance, the movable housing portion 32 comes to an equilibrium position, somewhere between the higher pumping efficiency position 50 and the lower pumping efficiency position 52, and the pump 20 supplies fuel at the delivery pressure setpoint.

When the delivery pressure drops below the delivery pressure setpoint, the bellows 56 and the spring 58 start moving the movable housing portion 32 toward the higher pumping efficiency position 50, thereby decreasing the clearance 46 and increasing the delivery pressure of the pump 20 toward the delivery pressure setpoint. Such back and forth movements of the movable housing portion 32 in response to changes of the delivery pressure that may occur during operation of the fuel system 17 of the aircraft engine 10 regulate the delivery pressure of the pump 20 toward the delivery pressure setpoint.

As seen from the description above, the passive pressure regulating mechanism 28 is operated by fluctuations/changes in the delivery pressure, and is hence a passive pressure regulating mechanism 28 as opposed to an active pressure regulating mechanism. It is contemplated that a different passive pressure regulating mechanism 28 could be used. For example, it is contemplated that a piston and poppet valve mechanism, with a corresponding spring biasing the movable housing portion 32 to the higher pumping efficiency position 50, could be used in place of the bellows 56 and the spring 58, respectively. A piston and poppet valve mechanism with a corresponding spring is a functional equivalent of the bellows 56 and the spring 58.

In yet other embodiments of the pump 20, an active pressure regulating mechanism is used instead of a passive pressure regulating mechanism. FIG. 1 shows an example of an active pressure regulating mechanism 70 that can be used instead of the passive pressure regulating mechanism 28. In the present embodiment, the active pressure regulating mechanism 70 includes an actuator 72 and a pressure sensor 74 that are communicatively coupled to a controller 76. However, it is contemplated that a different active pressure regulating mechanism, such as a hydraulic and/or pneumatic active pressure regulating mechanism, could be used.

In electric, or at least partially electric, embodiments of the active pressure regulating mechanism 70, the actuator 72 could be a stepper motor, or a servo motor with a corresponding encoder, operatively connected to the movable housing portion 32 via suitable gearing for example to selectively move the movable housing portion 32 between the higher pumping efficiency position 50 and the lower pumping efficiency position 52.

The stepper motor and the servo motor are both examples of an electric motor. It is contemplated that a different type of and/or one or more of electric motors could be used. It is contemplated that the actuator 72 could also be a hydraulic actuator operable via at least one corresponding electronically operated hydraulic valve (not shown) that is communicatively coupled to the controller 76. It is also contemplated that yet other suitable actuators could also be used.

As schematically shown in FIG. 1, the pressure sensor 74 of the present embodiment of the active pressure regulating mechanism 70 is hydraulically connected to the supply fuel conduit 39 that connects to the outlet 38 of the pump 20, remote to the outlet 38. It is contemplated that the pressure sensor 74 could be disposed at the outlet 38 of the pump. The pressure sensor 74 generates a signal that is indicative of the delivery pressure of the fuel being pumped by the pump 20.

In the embodiment shown in FIG. 1, the pressure sensor 74 is hydraulically connected to the outlet 38 and therefore generates a signal that is directly indicative of the delivery pressure at the outlet 38. It is contemplated that the pressure sensor(s) 74 could be disposed elsewhere in the fuel system 17 to generate signal(s) that would be indirectly indicative of the delivery pressure at the outlet 38. It is contemplated that the pressure sensor(s) 74 could be any suitable pressure sensor(s) and/or type of pressure sensor(s) and/or any suitable combination of different types of sensors.

In the embodiment shown in FIG. 1, the controller 76 is an electronic proportional-integral-derivative (PID) controller, although it is contemplated that a non-electronic controller could be used. The controller 76 includes a processor 80 and a non-transient memory 82 communicatively coupled to the processor 80. The non-transient memory 82 has processor-executable instructions thereon which, when executed by the processor 80, cause the controller 76 to execute a PID control algorithm that operates the stepper motor 72 in response to the signal from the pressure sensor 74 and thereby regulates the delivery pressure toward the delivery pressure setpoint. In some embodiments, the controller 76 is part of an engine electronic controller (not shown) of the engine 10.

That is, the controller 76 selectively operates the stepper motor 72 to move the movable housing portion 32 away from the fixed housing portion 30 to lower the delivery pressure or toward the fixed housing portion 30 to increase the delivery pressure, in response to fluctuations of the delivery pressure indicated by the signal from the pressure sensor 74. In embodiments implementing a PID control algorithm, the delivery pressure is an input to the PID control algorithm. The PID control algorithm is one example of a feedback control loop algorithm. It is contemplated that a different control algorithm could be used.

Figure 4:
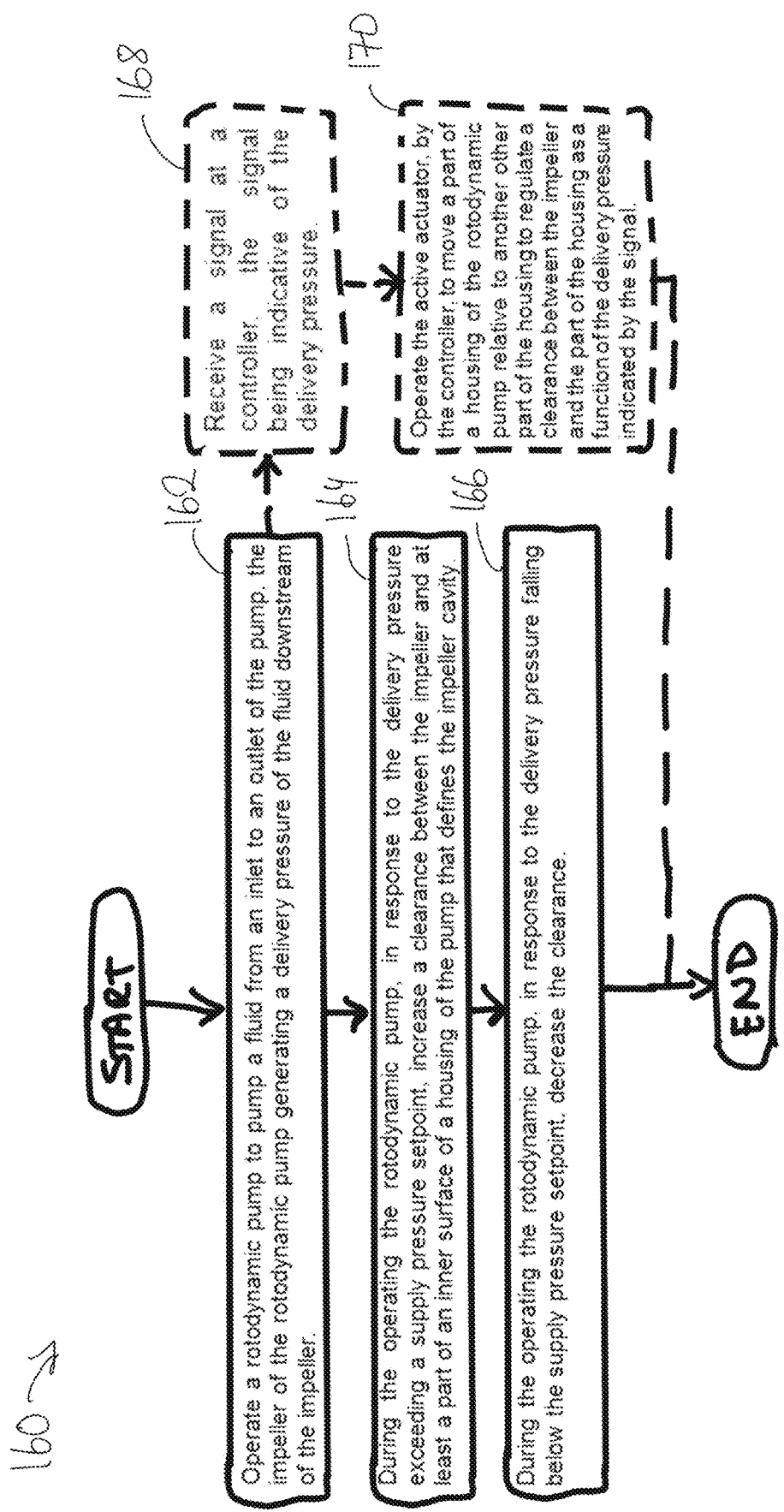
FIG. 4 is a logic flow diagram showing two methods of operating the rotodynamic pump of FIG. 2.

Now referring to FIG. 4, and with the above embodiments of the pump 20 in mind, the present technology provides a method 160 of regulating a delivery pressure of fluid supplied by a rotodynamic pump 20. While the method 160 is illustrated with respect to supplying fuel to the aircraft engine 10, it is contemplated that the method could also have other applications and/or other fluids.

In the present embodiment, the method 160 may start at step 162, at which the pump 20 is operated to pump a fuel from the inlet 36 to the outlet 38 of the pump 20, with the impeller 40 of the pump 20 rotating and generating the delivery pressure of the fuel downstream of the impeller 40, and more particularly in the present embodiment at the outlet 38.

The method 160 may further include step 164, which may be executed during operation the pump 20 in response to the delivery pressure exceeding a delivery pressure setpoint. Step 164 includes increasing a clearance 46 between the impeller 40 and at least a part of an inner surface 48 defining the impeller cavity 34. The method 160 may also include step 166, which may be executed during operation the pump 20 in response to the delivery pressure falling below the delivery pressure setpoint. Step 164 includes decreasing the clearance 46.

In embodiments in which the pump 20 includes a passive pressure regulating mechanism, such as the passive pressure regulating mechanism 28, during operation of the pump 20 the passive pressure regulating mechanism is operated by fluid pressure at the outlet 38 and thus repeatedly executes the steps 164 and 166 in an order corresponding to changes that may occur in the delivery pressure at the outlet 38 and thereby regulates the delivery pressure toward the delivery pressure setpoint of the pump 20.

In embodiments in which the pump 20 includes an active pressure regulating mechanism, such as the active pressure regulating mechanism 70, the method 160 may include step 168. Step 168 includes receiving a signal at a controller 76, the signal being indicative of the delivery pressure of the fuel downstream of the impeller 40. It is contemplated that the signal could be digital or analog, and could be transmitted to the controller 76 hydraulically, mechanically, or electrically/electronically via wire or wirelessly using a suitable corresponding transmission means, and depending on each particular embodiment of the pressure sensor(s) 74 and/or each particular embodiment of the controller 76. For example, it is contemplated that the signal could be a pneumatic or a hydraulic analog signal, transmitted to the controller 76 via air or a suitable hydraulic liquid.

In some active pressure regulating mechanism embodiments, the method 160 also includes step 170. Step 170 includes operating an actuator, such as the actuator 72, by the controller 76, to move a part 32 of the housing 26 relative to another other part 32 of the housing 26 to regulate the clearance 46 in response to changes of the delivery pressure indicated by the signal to regulate the delivery pressure toward the delivery pressure setpoint. In some such embodiments, the operating the actuator 72 includes executing, by the controller 79, a PID control algorithm with the delivery pressure being an input to the PID control algorithm. It is contemplated that in other embodiments, different control algorithms could be used.

In some embodiments, such as some embodiments where a passive pressure regulating mechanism is used, and in some embodiments where an active pressure regulating mechanism is used, the delivery pressure setpoint is a single pressure toward which the delivery pressure of the pump 20 is regulated. In other embodiments, such as some embodiments where an active pressure regulating mechanism is used, the delivery pressure setpoint is a range of pressures. For example, in some embodiments that include the active pressure regulating mechanism 70, the controller 76 may be configured to regulate the delivery pressure of the pump 20 by varying the clearance 46 to maintain the delivery pressure within a given range of pressures.

For example, the controller 76 may decrease the clearance 46 when the delivery pressure drops below a minimum pressure threshold that defines a lower end of the range of pressures, and may increase the clearance 46 when the delivery pressure exceeds a maximum pressure threshold that defines an upper end of the range of pressures. In such cases, the range of pressures may be said to be pre-defined. It is contemplated that the range of pressures may be pre-defined to suit each particular embodiment and application of the pump 20. It is contemplated that the range of pressures may be adjustable, such as via adjusting a configuration of the controller 76.

The pump 20 in its various embodiments, and the related components, may be constructed using known materials and manufacturing methods. The characteristics of the active and passive pressure regulating mechanisms may be selected using known engineering principles to suit each particular embodiment and application of the pump 20.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A rotodynamic pump for pumping a fluid, the rotodynamic pump comprising:
   a body defining a body cavity;
   an impeller disposed within the body cavity;
   a first housing portion disposed within the body cavity and defining at least in part an impeller cavity containing the impeller, and a second housing portion disposed within the body cavity and defining at least in part the impeller cavity, a portion of the body cavity defined between the second housing portion and the body, the portion of the body cavity fluidly sealed from the impeller cavity; and a pressure regulating mechanism configured to adjust a clearance between the impeller and the second housing portion to regulate pressure of the fluid downstream of the impeller;

wherein the second housing portion is movable relative to the first housing portion during operation of the rotodynamic pump to vary the clearance, and the pressure regulating mechanism is configured to move the second housing portion relative to the first housing portion to vary the clearance and thereby regulate a delivery pressure of the fluid at an outlet of the pump; and wherein the body extends at least in part around the second housing portion, wherein an inner surface of the body and an outer surface of the second housing portion at least partially define the portion of the body cavity, the portion of the body cavity being hydraulically isolated from an outer surface of the body.

2. The rotodynamic pump of claim 1, comprising a fluid conduit hydraulically connecting the outlet of the pump to the portion of the body cavity to feed fluid from the outlet to the portion of the cavity to apply a force on the second housing portion.

3. The rotodynamic pump of claim 2, comprising a biasing element biasing the second housing portion toward the first housing portion.

4. The rotodynamic pump of claim 3, comprising a bellows, the bellows and the biasing element being movable by movement of the second housing portion relative to the first housing portion.

5. The rotodynamic pump of claim 3, wherein the biasing element is a spring disposed between the second housing portion and the body, and the second housing portion is movable away from the first housing portion to compress the spring and the bellows.

6. The rotodynamic pump of claim 1, wherein the impeller is rotatable about a rotation axis to pump the fluid from an inlet of the pump to the outlet, and the second housing portion is movable relative to the first housing portion in a direction parallel to the rotation axis.

7. A fuel system for an aircraft engine, comprising the rotodynamic pump of claim 1, the rotodynamic pump when in use supplying fuel to the aircraft engine.

8. The rotodynamic pump of claim 1, wherein the pressure regulating mechanism includes an actuator and a pressure sensor that are operatively connected to a controller, the pressure regulating mechanism regulating the delivery pressure toward at least one delivery pressure setpoint by operating the actuator by the controller to selectively displace the second housing portion relative to the first housing portion in response to a signal indicative of the delivery pressure.

9. The rotodynamic pump of claim 8, wherein the actuator includes at least one of an electric motor, and a hydraulic actuator that is communicatively coupled to the controller.

10. The rotodynamic pump of claim 8, comprising a pressure sensor communicatively coupled to the controller and being hydraulically connected to the outlet to generate the signal while the rotodynamic pump is in use.

11. The rotodynamic pump of claim 8, wherein the at least one delivery pressure setpoint is a range of pressures.

12. The rotodynamic pump of claim 11, wherein the controller includes a processor and a non-transient memory communicatively coupled to the processor, the non-transient memory storing processor-executable instructions which, when executed by the processor, cause the controller to execute a proportional-integral-derivative (PID) control algorithm to operate the actuator in response to the signal to regulate the delivery pressure toward the at least one delivery pressure setpoint.

13. The rotodynamic pump of claim 1, wherein movement of the second housing portion relative to the first housing portion varies a size of the impeller cavity, and varies a size of the portion of the body cavity.

* * * * *